June 23, 1936. A. LINGG ET AL 2,045,037
RANGE FINDER FOCUSING ATTACHMENT FOR FOLDING CAMERAS
Filed April 17, 1934
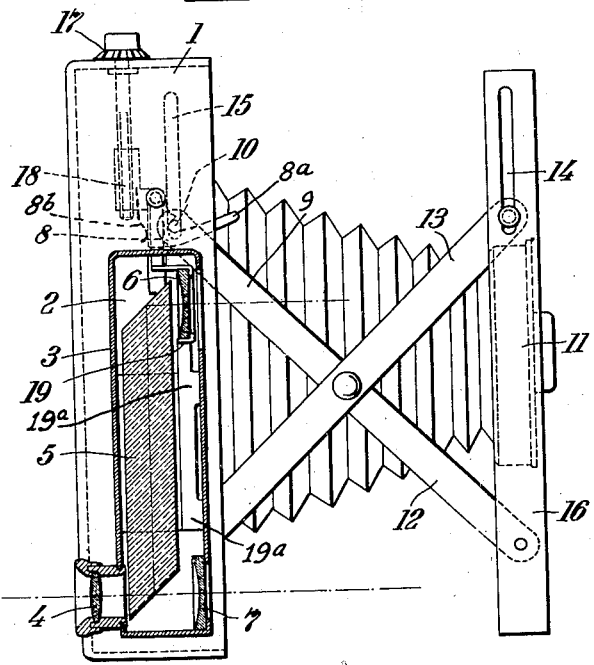
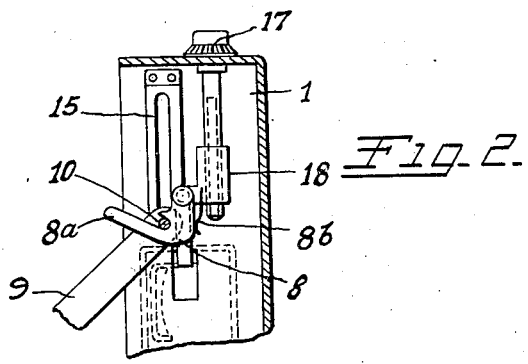
Inventors:-
Alfred Lingg,
Paul Frost,
by Philip S. Hopkins
Attorney.

Patented June 23, 1936

2,045,037

UNITED STATES PATENT OFFICE 2,045,037

RANGE FINDER FOCUSING ATTACHMENT FOR FOLDING CAMERAS

Alfred Lingg, Munich, and Paul Frost, Munich-Neuharlaching, Germany, assignors to Agfa Ansco Corporation, Binghamton, N. Y., a corporation of New York Application April 17, 1934, Serial No. 721,046
In Germany April 21, 1933

2 Claims. (Cl. 95—44)

Our present invention relates to a folding camera and more particularly to a folding camera provided with a range finder.

One of its objects is an improved camera of this type comprising a simple and efficient structure. Further objects will be seen from the detailed specification following hereafter. Reference is made to the accompanying drawing in which Figure 1 shows a plan view of a camera according to this invention with a range finder mounted on the casing partially in section, Fig. 2 shows a detailed view of the device for actuating the range finder and adjusting the objective.

Among the known range finders, two types have proved suitable for being mounted inside photographic cameras. With one of these types the parallax angles are measured by moving one of two mirrors inclined to the optical axis at an angle of 45°. With the other type the same effect is obtained by displacing part of the lens system in a direction parallel to the base of the range finder. This latter type is the more preferable for the reason that the instrument may be more easily adjusted, as the very delicate control of the mirrors is dispensed with. This kind of range finder was hitherto coupled with the objective of the photographic camera by means of small chains or the like.

It has been found that range finders of the latter type are particularly suited for being mounted inside collapsible cameras, the front and back parts of which are connected together by means of struts themselves pivotally connected together and connected by their ends to the front and back parts of the camera in such manner that the struts may be opened or closed as in the manner of a lazy tongs, thus permitting the relative positions of the front and back parts of the camera to be varied. The struts are disposed and connected to the two parts of the camera so that the end of one of the struts which is connected on one side of the camera to the back part and is adjacent to the ground glass focussing screen will have a movement parallel to a side of the camera casing. There need not be adopted, therefore, special means for transmitting the movement of the objective to the adjustable part of the range finder, but the mount of the optical means for controlling the range finder is coupled with the struts so as to be directly adjusted by them. The range finder is preferably combined with a Galilean view finder.

Referring to the figure, 2 is a range finder attached to or inserted in the camera casing 1 which range finder may be covered by a protective cap 3 or the like or may be freely mounted inside the casing. The range finder focussing attachment consists of a positive lens 4, a base-forming prism 5 and negative lenses 6 and 7. The negative lens 6 may, for purposes of adjustment, be displaced together with the prism 5 with relation to the fixed lens 4. In the path of the direct rays there is inserted a second negative lens 7 which together with the lens 4 constitutes a Galilean view finder. The object to be taken, therefore, is viewed when range finding both directly through the lenses 4, 7 and through the lens section 6, the prism 5 and the lens 4. The lens section 6 is displaced until both the partial pictures are brought into register.

According to the invention, the mount 19 of the lens 6 and of the prism 5 is provided with a flexible fork 8 which in a flexible manner embraces the extremity 9 of the strut 12 nearest the focussing screen or a pin 10 fixed thereto. When adjusting the objective 11 pins on the upper ends of the struts 12 and 13 which are pivotally connected together at 20 are displaced in slides 14 and 15 in a direction parallel to the lens front 16 or to the longitudinal sides of the camera casing; the other ends of the struts being fixed respectively to the camera casing 1 and the lens front 16, these two parts being the back and front parts referred to previously which are connected by the struts 12 and 13.

The range finder and the objective are adjusted, for instance, by a milled knob 17 which, by means of the toothed gear or a micrometer screw 18, moves the lens mount 19 and, in consequence, the extremity of the strut 9 and the objective 11. The elastic fork 8 is so constructed that the pin 10 is withdrawn from the fork when folding the camera and automatically fits again in the fork 8 when extending the objective mount into the infinity position.

The range finder, therefore, is coupled up with the objective only for controlling the latter.

What we claim is:

1. In a folding camera in combination, a casing comprising a front part and a rear part each provided with a slot, struts pivotally connected together and connecting said front part and said rear part, one end of said struts engaging said slots in said front part and said rear part, the other end of said struts being pivotally mounted on said front and said rear part, a range finder mounted on the rear part of said casing comprising two reflecting planes at a fixed distance from each other, facing each other and inclined towards the optical axis by 45°, two concave lenses mounted each in front of one of said inclined planes, and a convex lens mounted behind the inclined planes facing said convex lens in alignment with said concave lenses mounted in front of said inclined plane facing said convex lens to form a Galilean finder, and means directly co-operating with the free end of said strut engaging said slot in said rear part for displacing said concave lens not in alignment with said convex lens substantially parallel to the basis of the range finder.

2. In a folding camera in combination, a casing comprising a front part and a rear part each provided with a slot, struts pivotally connected together and connecting said front part and said rear part, one end of said struts engaging said slots in said front part and said rear part, the other end of said struts being pivotally mounted on said front and said rear part, a range finder mounted on the rear part of said casing comprising two reflecting planes at a fixed distance from each other, facing each other and inclined towards the optical axis by 45°, two concave lenses mounted each in front of one of said inclined planes, and a convex lens mounted behind the inclined planes facing said convex lens in alignment with said concave lenses mounted in front of said inclined plane facing said convex lens to form a Galilean finder, and means directly co-operating with the free end of said strut engaging said slot in said rear part for displacing said concave lens not in alignment with said convex lens together with said inclined planes substantially parallel to the range finder.

ALFRED LINGG.
PAUL FROST.